US 6,671,312 B2

(12) United States Patent
Lanier et al.

(10) Patent No.: US 6,671,312 B2
(45) Date of Patent: Dec. 30, 2003

(54) TELECOMMUNICATIONS LINE TEST METHOD

(75) Inventors: Raymond H. Lanier, Concord, NH (US); Robert W. Rock, Bow, NH (US)

(73) Assignee: TrueComm, Inc., Concord, NH (US)

( * ) Notice: Subject to any disclaimer, the term of this patent is extended or adjusted under 35 U.S.C. 154(b) by 496 days.

(21) Appl. No.: 09/765,803

(22) Filed: Jan. 19, 2001

(65) Prior Publication Data

US 2002/0097792 A1 Jul. 25, 2002

(51) Int. Cl.[7] .................................................. H04B 1/38
(52) U.S. Cl. ....................................................... 375/222
(58) Field of Search ................................. 375/219, 220, 375/221, 222, 224, 231; 370/278, 297, 282, 276, 385, 386; 379/93.01, 93.05, 93.06, 130

(56) References Cited

U.S. PATENT DOCUMENTS

| | | | |
|---|---|---|---|
| 5,881,130 A | 3/1999 | Zhang | 379/6 |
| 6,052,412 A * | 4/2000 | Ruether et al. | 375/231 |
| 6,091,713 A | 7/2000 | Lechleider et al. | 370/248 |
| 6,177,801 B1 | 1/2001 | Chong | 324/520 |
| 6,181,775 B1 | 1/2001 | Bella | 379/29 |
| 6,215,855 B1 | 4/2001 | Schneider | 379/22 |
| 6,292,539 B1 | 9/2001 | Eichen et al. | 379/1.04 |
| 6,373,923 B1 | 4/2002 | Williamson et al. | 379/22.01 |
| 6,385,297 B2 | 5/2002 | Faulkner et al. | 379/1.04 |
| 6,389,109 B1 | 5/2002 | Schmidt et al. | 379/1.04 |
| 6,538,451 B1 * | 3/2003 | Galli et al. | 324/533 |
| 6,563,864 B1 * | 5/2003 | Ibrahim et al. | 375/222 |
| 6,574,280 B1 * | 6/2003 | Liau et al. | 375/242 |
| 6,574,308 B1 * | 6/2003 | Macdonald et al. | 379/1.04 |
| 6,584,078 B1 * | 6/2003 | Betts | 370/276 |

* cited by examiner

Primary Examiner—Emmanuel Bayard
(74) Attorney, Agent, or Firm—Bourque & Associates, P.A.

(57) ABSTRACT

A system and method of estimating wideband performance characteristics of a telecommunications subscriber loop by identifying and inventorying broadband inhibitors that are present in the subscriber loop. The method begins by inventorying a client computer and associated components. Then, a voice band modem call from a modem associated with the client computer is placed to a remote access server (RAS) under the control of a server computer. Next, once the connection is established between the client computer and the RAS, the RAS extracts modem training and line probing signals received from the client computer modem. In addition, the client computer transmits its inventory of components to the RAS. The RAS then analyzes the received signals and component inventory to identify and inventory potential wide band inhibitors that are present in the subscriber loop being analyzed.

20 Claims, 2 Drawing Sheets

TELECOMMUNICATIONS LINE TEST METHOD

FIELD OF THE INVENTION

The present invention relates to the testing of telecommunications lines and, more particularly, to a method of testing telecommunications lines to identify wideband signal inhibitors, which will enable a telecommunications provider to readily determine if a given telecommunications line will support wideband transmission technologies without reliance on line records residing on Operational Support Systems (OSS), design records or geographical databases.

BACKGROUND OF THE INVENTION

As the use of wideband transmission technologies increases, there has become an increasing need to be able to identify if specific portions of existing telecommunications networks are capable of supporting such wideband transmission technologies. Since a significant portion of existing telecommunications networks rely on copper cable technologies, and since the upgrade of such copper cable networks has been rather slow and costly, a need has arisen to utilize existing copper cables as conduits for wideband telecommunications technologies. However, since the overwhelming majority of copper cable telecommunications networks was designed and installed to support only voice transmission technologies, many networks include components that enhance voice communications but inhibit wideband transmissions.

One attempt to estimate wideband transmission performance over an existing voice telecommunication network is described in U.S. Pat. No. 6,091,713, which issued to Lechleider et al. on Jul. 18, 2000. While the Lechleider et al. patent does offer one means by which a telecommunication loop's wideband performance characteristics can be estimated, it does not attempt to identify the specific type and number of wideband inhibitors present in a particular loop circuit. Often times it would be desirable to not only be in a position to predict wideband performance but it would also be desirable to identify the type and number of potential wideband inhibitors so that a determination can be made as to whether a particular loop circuit can be readily modified to support wideband transmission technologies or whether the particular loop circuit should be replaced with more modern technologies.

SUMMARY OF THE INVENTION

Accordingly, the disclosed invention provides a system and method of estimating wideband performance characteristics of a telecommunications subscriber loop by identifying and inventorying broadband inhibitors that are present in the subscriber loop. The method begins by inventorying a client computer and associated components. Then, a voice band modem call from a modem associated with the client computer is placed to a remote access server (RAS) under the control of a server computer. Next, once the connection is established between the client computer and the RAS, the RAS extracts modem training and line probing signals received from the client computer modem. In addition, the client computer transmits its inventory of components to the RAS. The RAS's server computer then analyzes the received signals and component inventory to identify and inventory potential wide band inhibitors that are present in the subscriber loop being analyzed.

DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
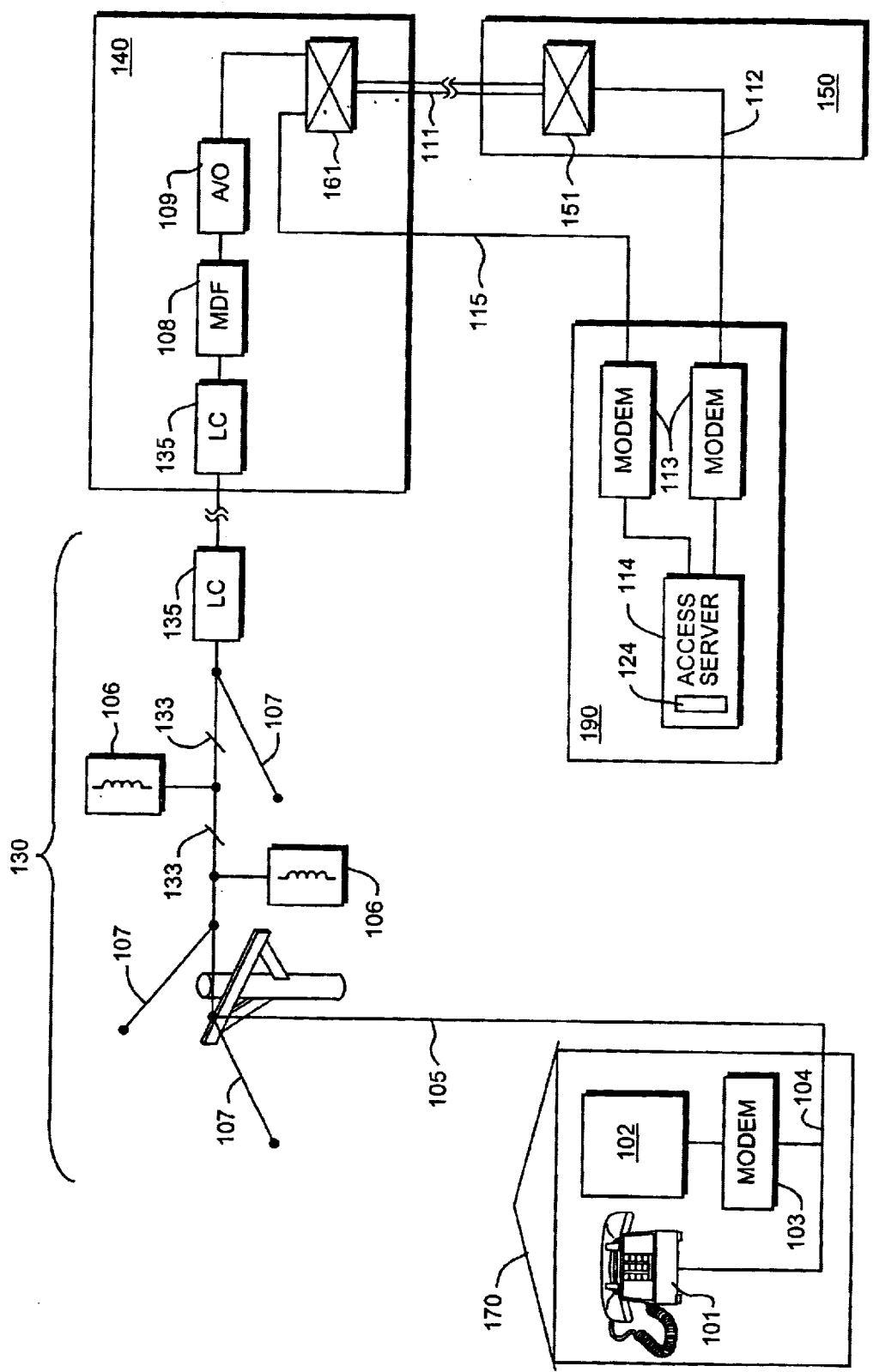
FIG. 1 shows a block diagram of a typical subscriber loop connected to a telephone company central office.

Turning now to the figures a typical architecture 1, for connecting a telecommunications subscriber to the public switched telephone network (PSTN) is shown. The architecture connects a subscriber or customer home 170, which has a telephone 101 coupled to home wiring 104 and a logic device 102 coupled to a customer modem 103. The logic device 102 may be any device having sufficient logic to place a telephone call over modem 103. Examples of logic devices include personal computers, set top boxes, web TVs and other devices capable of placing outgoing modem calls. The logic device 102 may also be a test set having a modem and the logic necessary to place an outgoing call, which is temporarily connected to home wiring in a customer home 170.

The first modem 103 is coupled to an originating office 140 by subscriber loop 130. The subscriber loop may include unshielded home wiring, 104, drop wires 105, bridged taps 107, splices 133, loading coils 106, loop carrier systems 135, as well as the transmission cabling making up the loop. All of the above mentioned are analog elements that define the analog properties of the subscriber loop 130.

As a telephone signal enters the originating office 140, it eventually is wired to a main distributing frame 108. In the originating office 140, the signal typically encounters an analog to digital converter 109, which may be incorporated into a digital switch 161.

As the signal leaves originating office 140 it may traverse a digital line or facility 115, where it will terminate at a modem 113 in a line analysis center 190. Of course, the line analysis center may include any number of modems 113 to allow multiple lines to be analyzed at any given time. The modem or modems 113 are then coupled to a remote access server 114, having an associated line qualification processor 124 at the line analysis center 190.

Alternatively the telephone signal may leave the originating office 140 and travel to a terminating office 150, via a digital trunk line or facility 111. In this case, when the signal reaches the terminating office 150, it terminated on a digital switch 151, which couples the signal to a digital interface 112, which terminates at a modem 113 in a line analysis center 190. The second modem 113 is then coupled to a remote access server 114, having an associated line qualification processor 124 at the line analysis center 190.

In operation, a software application is loaded on the logic device 102. The application inventories all of the physical hardware associated with the logic device and stores the inventory information in a storage buffer pending transmission to the line analysis center 190 during a line qualification session.

Once a qualification session is established between a logic device 102 and the remote access server 114 at the line analysis center 190, the first or originating modem transmits analog voice band modem training and line probing signals to the line analysis center. The line qualification processor 124 then analyzes the received signals and using methodologies described in more detail below, qualifies a subscriber loop as being able to support copper-based wide band transmission technologies by identifying wide band inhibitors present in the subscriber loop being qualified.

Figure 2:
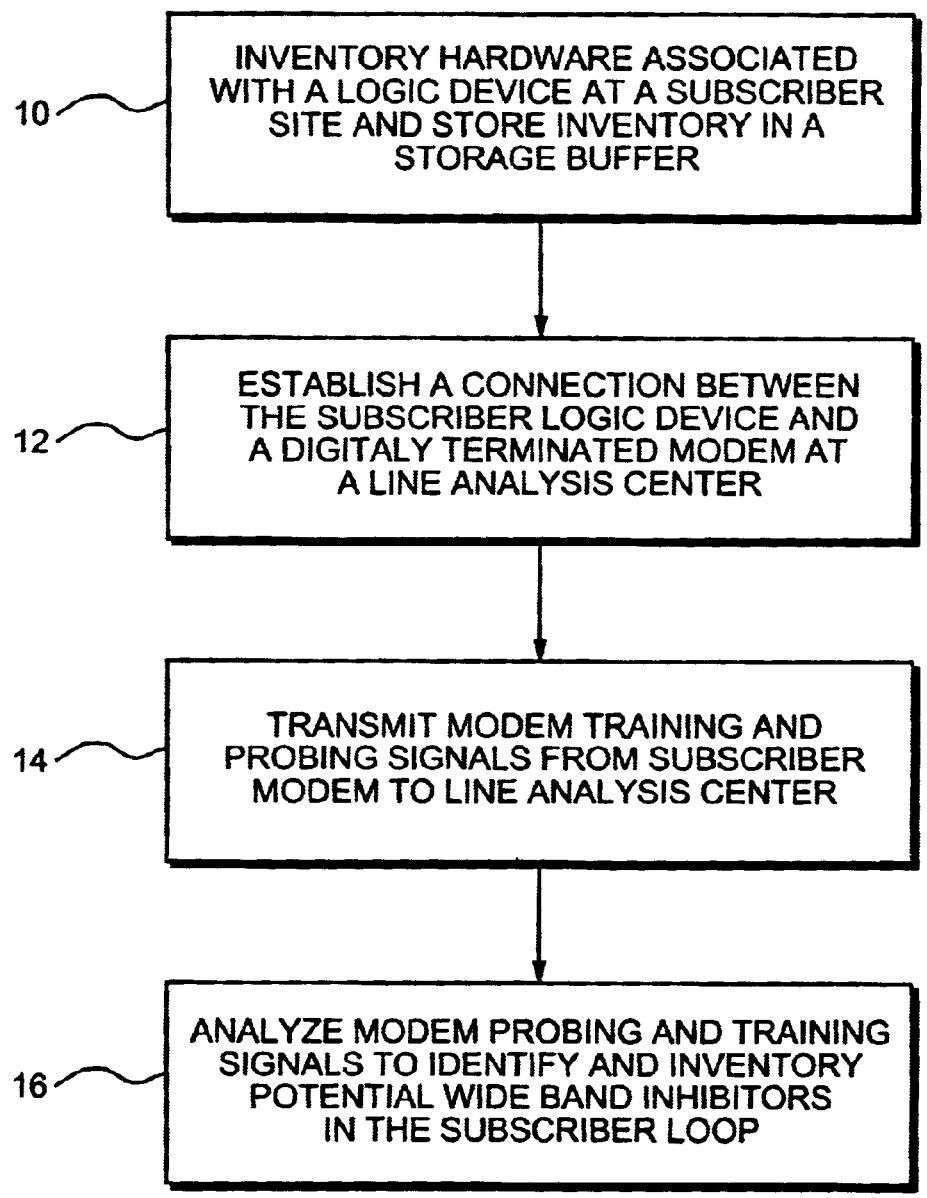
FIG. 2 shows a flow diagram of a method of analyzing a subscriber loop to qualify the loop for its ability to support copper-based wide band transmission technologies according to the teachings of the present invention.

The methodology utilized by the present invention for qualifying a subscriber loop for its ability to support copper-based wide band transmission technologies is shown in FIG. 2. The method 1 begins with an inventory of all of the physical hardware associated with a logic device located at a subscriber site, act 10. The inventory of hardware is stored in a storage buffer where it can be accessed and retrieved for transmission to a line analysis center at an appropriate time.

The method continues in act 12, wherein a connection between a modem associated with the subscriber logic device and a digitally terminated modem at a line analysis center is established. Once the connection is established, modem training and probing signals along with the subscriber logic device hardware inventory are transmitted from said subscriber modem to said digitally terminated modem, act 14. Then, in act 16, the transmitted modem training and probing signals are analyzed at the line analysis center to identify and inventory potential wide band inhibitors present in said subscriber loop.

A first type of wide band inhibitor that the disclosed methodology is aimed at identifying is loading coils that are present in the subscriber loop. Loading coils 106 (FIG. 1) are deployed in subscriber loops to reduce the loss of signals in the voice band. However, loading coils effectively block typical signals used in wide band technologies, such as the ADSL band.

Modems using V.34, V.90, or V.92 modulation standards exchange probing tones at fixed frequency intervals and levels during their initial connection phase in order to establish optimal operating parameters. The invention uses this data as well as other known parameters about the circuit such as digital pad values and other predefined loss characteristics of the terminating office to establish realistic frequency response characteristics for the local loop under test.

The classical method of locating load coils is to examine the frequency response in 2000 to 4000 Hz spectrum and determine if the slope of the loss characteristics exceeds a threshold value. In one embodiment, the present invention uses a different approach, whereby the spectrum in the frequency range of 600 Hz to 3150 Hz is examined. The straight-line slope of the loss characteristics is compared with the deviations from this slope to locate the maximum loss deviation from the expected value for a given frequency within the specified range. A loading coil is detected if this value exceeds a predefined threshold. This approach has been determined to yield less false detections than the classical approach.

In another embodiment, loading coil detection is accomplished using voice band phase delay data that is obtained during the modem training period. Since the inductive effect of a loading coil causes a shift in phase for a given frequency, detecting phase shifts can provide an accurate determination of not only the presence but also the number of loading coils present in a subscriber loop. Phase shifts or phase delays, increase as frequency increases. Therefore, phase delay information, either provided by the subscriber or server modem, determined as a function of probing tone analysis, can be used to identify the presence of loading coils.

Typical values for phase delay on unloaded local loops are less than 120 degrees at frequencies less than 3 kHz and 90 degrees at 1 kHz. Since 1 kHz lays well within the linear portion of the band pass of a PCM (pulse code modulation) filter of a line card in a digital switch or digital loop carrier (DLC) system, most of the influence effects of the line card filter are eliminated. This is unlike the use of frequency versus loss methods, which require making a determination close to, at or after the high frequency cut off knee of the line card filter, which is an extremely none linear region for a PCM low pass filter. Since line card filters vary from manufacture to manufacturer, the exact loss response at the low pass cut off frequency cannot be exactly known for any given connection. Thus, there is a relatively high uncertainty of the results of such tests as compared to the use of phase delay measurements in the 1 kHz to 2.7 kHz region.

In practice, when a single load coil is present in a subscriber loop, the shift in phase delay creates an additional 15 to 25 degrees of phase delay at 1 kHz over non-loaded subscriber loops. In addition, the number of load coils significantly affects the phase delay at 2.7 kHz resulting in excess of 360 degrees when three or more load coils are present. We have also found that each additional load coil adds an additional 15 to 25 degrees of phase delay at 1 kHz, making it possible to reliably count the number of load coils with a high degree of accuracy. The phase delay detection technique also is much better suited for detecting a single load coil no matter where the load coil is located in the local loop and works equally well for short and long local.

An additional advantage of the load coil phase delay detection method over the frequency versus loss method is that besides detecting and counting the common H88 type of load coils it also allows the detection and counting of D66 type of load coils. D66 type load coils exhibit a very low frequency verses loss characteristic in the PCM pass band making the frequency versus loss method very unreliable for detecting D66 load coils in a subscriber loop.

Another methodology for detecting load coils according to another embodiment of the present invention involves the monitoring of V.90/V.92 RAS to subscriber modem down link speed. When a V.90 down link speed is substantially equal to or greater then 48 kbps it is highly unlikely that any load coils are present in a subscriber loop.

Yet another embodiment of the invention involves detecting the presence of universal digital loop carrier (UDLC) devices. Such devices can be detected using frequency versus loss results from modem probing signals. The design of UDLC devices results in certain frequency response characteristics that are used by the one method of the present invention in qualifying a copper-based subscriber loop for wide band compatibility. A UDLC device causes the modem probing signals to typically experience three analog-to-digital conversions (one at each end of the UDLC device and one additional conversion at the switch line card) These conversions result in significantly increased attenuation distortion in the 3300 to 4000 Hz spectra. Analysis of various subscriber loops using UDLC systems indicate that the loss differential between 3300 Hz and 3750 Hz will exceed 24 dB when these UDLC devices are present.

Additionally, the analog line circuits previously indicated result in higher than normal low frequency attenuation loss, typically exceeding a loss differential of 10 dB between 150 and 300 Hz. By combining the detection of both the high and low frequency characteristics discussed above, a UDLC or a Digital Add a Main Line (DAML) device can be readily detected.

Furthermore, the phase delay measurement method discussed earlier can also be used to detect an UDLC or DAML that is present in a local loop. Since there are multiple PCM filters, excessive additional phase delay is added at both the low and high frequency cut-off regions of the PCM pass band. By observing the compounded phase delay caused by the three PCM pass band filters along with the frequency versus loss method described above, a more accurate detection of a UDLC or DAML can be made.

This detection method can be extended to include any device within the local loop, which contains multi high and low pass filters, such as analog frequency division multiplex (FDM) carrier systems. Because the number of voice band filters is the same for UDLC systems as it is for FDM based systems, this results in excessive attenuation at the high and low pass band filter edges and corresponding increase in phase delay.

In another embodiment of the present invention, and integrated digital loop carrier (IDLC) system present in a local loop can be detected using a robbed bit signaling (RBS) methodology. This methodology requires that the RAS be terminated at the same central office where the subscriber's local loop is terminated or, at a minimum, be located at a host switch site for a subscriber that is connected to a host switch remote unit that is controlled by the host where the RAS is terminated. This results in RBS only being present when an IDLC is part of the subscriber loop. Otherwise if no RBS is detected, the subscriber loop does not contain an IDLC.

The RBS indication is present only in a V.90 or V.92 connection and is only resident at the subscriber's modem. To obtain the RBS indication, the software application running on the subscriber logic device queries the remote modem to obtain the RBS indication. This is then forwarded to the Remote Access Server via the modem connection during the pre-qualification session.

The presence of an IDLC system in a subscriber loop can also be detected using a methodology that compares loop loss with central office (CO) to subscriber geographic distance. This method allows for the RAS to be located anywhere in the telephone network. An IDSL system is detected using this method by noting the difference between the local loop loss and the CO-to-subscriber geographical coordinates calculated distance. If the local loop loss is equal or less then 30% to 50% of the distance of the geographical coordinates, an IDLC is declared to be present in the subscriber loop.

A subscriber loop is further qualified for wide band compatibility by performing a loop quality verification. Since wide band performance is also dependent on a loop's ability to reject the ingress of unwanted signals that interfere with transmitted signals, a determination of the extent to which interference is present on a subscriber loop must be made.

The ability of a subscriber loop copper pair, within a telephone cable, to reject ingress signals is directly related to the pair's balance and the quality of its dielectric insulation. To test the subscriber's local loop pair for these qualities the method and system observes the V.90 RAS-to-subscriber's modem downlink speed. If the downlink speed equals or exceeds a predetermined speed for the cable loss measured, and the error rate of a downlink transmitted file is less than a predetermined error rate, then the subscriber loop cable pair is determined to have a high enough balance and insulation quality to support wideband data transmission. If a subscriber loop passes the test, then the loop is declared acceptable for wideband data transmission. If the test fails then the cable pair is considered marginal or questionable for narrow band and wideband data transmission.

Using the modem probing signals, the disclosed invention can also be used to estimate a subscriber loop's physical length provided that no load coils are detected. Several factors preclude the straightforward approach of estimating distance through division of loss by a loss per foot constant. Due to limitations in modem implementations or the modulation type being used, the digital pad value used in trunk terminations may not be detected. Furthermore, the level of the originating tones varies among modem vendors.

A fairly accurate estimate of the distance can, however, be calculated using the accumulative capacitive effects of the subscriber loop within the linear frequency response region of the line card interface. A good estimation of distance can be realized by dividing the attenuation loss between 1050 Hz and 3000 Hz by a constant (typically 0.6).

Accordingly, the disclosed invention provides a methodology of qualifying a copper-based telecommunication subscriber loop for wide band transmission compatibility by utilizing novel techniques to identify and inventory potential wide band inhibitors that are present in the subscriber loop.

Modifications and substitutions by one of ordinary skill in the art are considered to be within the scope of the present invention which is not to be limited except by the claims which follow.

What is claimed is:

1. A method of qualifying a telecommunications subscriber local loop for its ability to support wide band transmission service, said method comprising:

inventorying hardware associated with a logic device at a subscriber location;

establishing a connection between a modem associated with said subscriber logic device and a digitally terminated modem at a line analysis center;

transmitting modem training and probing signals and said subscriber logic device hardware inventory from said subscriber modem to said digitally terminated modem;

analyzing said transmitted modem training and probing signals to identify and inventory potential wide band inhibitors present in said subscriber loop.

2. The method of claim 1, wherein said act of analyzing said transmitted modem training and probing signals to identify and inventory potential wide band inhibitors present in said subscriber loop comprises detecting and counting load coils present in said subscriber loop by comparing a straight line slope of loss characteristics with deviations from said straight line slope to locate a maximum loss deviation from an expected value for a given frequency range.

3. The method of claim 2, wherein said given frequency range is substantially between 600 and 3,150 Hz.

4. The method of claim 1, wherein said act of analyzing said transmitted modem training and probing signals to identify and inventory potential wide band inhibitors present in said subscriber loop comprises detecting and counting load coils present in said subscriber loop using voice band phase delay from said transmitted modem training and probing signals.

5. The method of claim 4, wherein a load coil is counted for each 15–25 degrees of additional phase delay detected at 1 kHz.

6. The method of claim 1, wherein said act of analyzing said transmitted modem training and probing signals to identify and inventory potential wide band inhibitors present in said subscriber loop comprises analyzing a V.90/V/92 downlink speed between a remote access server at said line analysis center and said subscriber logic device modem.

7. The method of claim 1, wherein said act of analyzing said transmitted modem training and probing signals to identify and inventory potential wide band inhibitors present in said subscriber loop comprises detecting universal digital loop carrier (UDLC) system devices present in said subscriber loop.

8. The method of claim 7, wherein said acts of detecting said universal digital loop carrier (UDLC) system devices present in said subscriber loop comprises analyzing attenuation distortion in a 3300–4000 Hz spectrum.

9. The method of claim 8, wherein a UDLC system is determined to be present in said subscriber loop when said attenuation distortion exceeds substantially 24 dB.

10. The method of claim 7, wherein said acts of detecting said universal digital loop carrier (UDLC) system devices present in said subscriber loop comprises by observing compounded phase delay caused by pulse code modulation (PCM) filters.

11. The method of claim 1, wherein said act of analyzing said transmitted modem training and probing signals to identify and inventory potential wide band inhibitors present in said subscriber loop comprises detecting integrated digital loop carrier (IDLC) systems using robbed bit signaling (RBS) detection.

12. The method of claim 1, wherein said act of analyzing said transmitted modem training and probing signals to identify and inventory potential wide band inhibitors present in said subscriber loop comprises detecting integrated digital loop carrier (IDLC) systems by comparing loop loss with central office to subscriber geographic distance.

13. A method of qualifying a telecommunications subscriber local loop for its ability to support wide band transmission service, said method comprising:

establishing a connection between a modem associated with said subscriber logic device and a digitally terminated modem at a line analysis center;

transmitting modem training and probing signals and said subscriber logic device hardware inventory from said subscriber modem to said digitally terminated modem; and analyzing said transmitted modem training and probing signals to detect and count load coils present in said subscriber loop by comparing a straight line slope of loss characteristics with deviations from said straight line slope to locate a maximum loss deviation from an expected value in a frequency range substantially between 600 and 2,000 Hz.

14. A method of qualifying a telecommunications subscriber local loop for its ability to support wide band transmission service, said method comprising:

establishing a connection between a modem associated with said subscriber logic device and a digitally terminated modem at a line analysis center;

transmitting modem training and probing signals and said subscriber logic device hardware inventory from said subscriber modem to said digitally terminated modem; and analyzing said transmitted modem training and probing signals to detect and count load coils present in said subscriber loop using voice band phase delay from said transmitted modem training and probing signals, wherein a load coil is counted for each 15–25 degrees of additional phase delay detected at 1 kHz.

15. A method of qualifying a telecommunications subscriber local loop for its ability to support wide band transmission service, said method comprising:

establishing a connection between a modem associated with said subscriber logic device and a digitally terminated modem at a line analysis center;

transmitting modem training and probing signals and said subscriber logic device hardware inventory from said subscriber modem to said digitally terminated modem; and analyzing said transmitted modem training and probing signals to detecting universal digital loop carrier (UDLC) system devices present in said subscriber loop.

16. The method of claim 15, wherein said acts of detecting said universal digital loop carrier (UDLC) system devices present in said subscriber loop comprises analyzing attenuation distortion in a 3300–4000 Hz spectrum.

17. The method of claim 16, wherein a UDLC system is determined to be present in said subscriber loop when said attenuation distortion exceeds substantially 24 dB.

18. The method of claim 15, wherein said acts of detecting said universal digital loop carrier (UDLC) system devices present in said subscriber loop comprises by observing compounded phase delay caused by pulse code modulation (PCM) filters.

19. A method of qualifying a telecommunications subscriber local loop for its ability to support wide band transmission service, said method comprising:

establishing a connection between a modem associated with said subscriber logic device and a digitally terminated modem at a line analysis center;

transmitting modem training and probing signals and said subscriber logic device hardware inventory from said subscriber modem to said digitally terminated modem; and analyzing said transmitted modem training and probing signals to detect integrated digital loop carrier (IDLC) systems using robbed bit signaling (RBS) detection.

20. A method of qualifying a telecommunications subscriber local loop for its ability to support wide band transmission service, said method comprising:

establishing a connection between a modem associated with said subscriber logic device and a digitally terminated modem at a line analysis center;

transmitting modem training and probing signals and said subscriber logic device hardware inventory from said subscriber modem to said digitally terminated modem; and analyzing said transmitted modem training and probing signals to detect integrated digital loop carrier (IDLC) systems by comparing loop loss with central office to subscriber geographic distance.

* * * * *